(12) United States Patent
Martin et al.

(10) Patent No.: US 9,043,799 B1
(45) Date of Patent: May 26, 2015

(54) MANAGING ACCESS TO A SHARED RESOURCE BY TRACKING ACTIVE REQUESTOR JOB REQUESTS

(75) Inventors: John Martin, Centennial, CO (US);
Jonathan Lucero, Centennial, CO (US);
John Bullock, Centennial, CO (US);
Zion Lo, Centennial, CO (US)

(73) Assignee: IQNAVIGATOR, INC., Centennial, CO (US)

( * ) Notice: Subject to any disclaimer, the term of this patent is extended or adjusted under 35 U.S.C. 154(b) by 0 days.

(21) Appl. No.: 12/982,581

(22) Filed: Dec. 30, 2010

(51) Int. Cl.
*G06F 9/46* (2006.01)

(52) U.S. Cl.
CPC ............ *G06F 9/46* (2013.01); *G06F 2209/504* (2013.01); *G06F 2209/503* (2013.01)

(58) Field of Classification Search
None
See application file for complete search history.

(56) References Cited

U.S. PATENT DOCUMENTS

| | | | |
|---|---|---|---|
| 5,437,032 A | 7/1995 | Wolf et al. | |
| 6,353,844 B1 | 3/2002 | Bitar et al. | |
| 6,832,263 B2 | 12/2004 | Polizzi et al. | |
| 7,020,878 B1 | 3/2006 | Rhee et al. | |
| 7,051,330 B1 * | 5/2006 | Kaler et al. | 718/106 |
| 7,266,821 B2 | 9/2007 | Polizzi et al. | |
| 7,448,036 B2 | 11/2008 | Brenner et al. | |
| 7,526,767 B1 | 4/2009 | Rhee et al. | |
| 2006/0195508 A1 | 8/2006 | Bernardin et al. | |
| 2007/0089114 A1 * | 4/2007 | MacInnis | 718/103 |
| 2008/0306950 A1 | 12/2008 | Richards et al. | |
| 2009/0132536 A1 | 5/2009 | Brown et al. | |
| 2009/0132611 A1 | 5/2009 | Brown et al. | |
| 2009/0288090 A1 * | 11/2009 | Ujibashi et al. | 718/103 |
| 2010/0153957 A1 * | 6/2010 | Xu | 718/102 |
| 2012/0054765 A1 * | 3/2012 | Lee et al. | 718/104 |

* cited by examiner

*Primary Examiner* — Eric C Wai
(74) *Attorney, Agent, or Firm* — Perkins Coie LLP (57) ABSTRACT

The technology of the present application provides a networked computer system with at least one workstation and at least one shared resource such as a database. Access to the database by the workstation is managed by a database management system. An access engine reviews job requests for access to the database and allows job requests access to the resource based protocols stored by the system.

13 Claims, 6 Drawing Sheets

MANAGING ACCESS TO A SHARED RESOURCE BY TRACKING ACTIVE REQUESTOR JOB REQUESTS

CLAIM OF PRIORITY UNDER 35 U.S.C. §119

None.

CLAIM OF PRIORITY UNDER 35 U.S.C. §120

None.

REFERENCE TO CO-PENDING APPLICATIONS FOR PATENT

None.

BACKGROUND

Field

The technology of the present application relates generally to managing access to a shared computer or electronic memory, and more specifically, to a system and method to manage multiple user access to a shared memory such that multiple users may access the memory in a timely manner.

Background

Shared, or networked, computers are relatively common. Many companies have intranets where workstations may access the same set of applications, processors, peripheral devices, and memories or storage, etc. (generically referred to as "equipment"). Still more people and companies access equipment over the Internet or other public access network.

Figure 1:
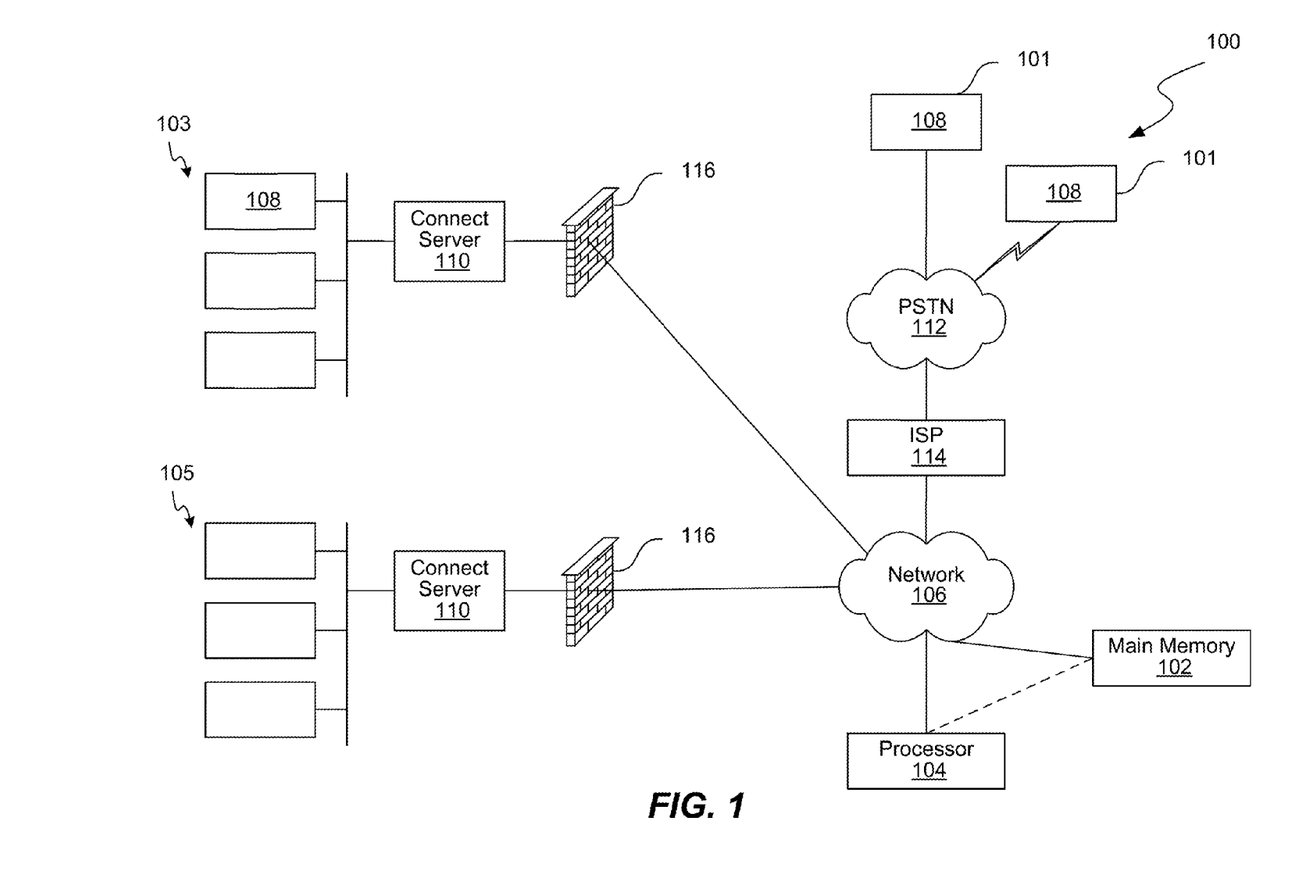
FIG. 1 is a functional block diagram of a conventional prior art networked computer system.

Referring now to FIG. 1, an exemplary prior art networked computer system 100 is provided. Networked computer system 100 may facilitate the operation of a number of applications and software packages. For example, the networked computer system 100 may provide a vendor management system, a managed service program, etc. Networked computer system 100 has at least one main memory 102 or data storage facility that stores the data in a database or the like. Main memory may be a non-volatile or a volatile memory as a matter of design choice. A database management system (DBMS) 104, which is generally executed on one or more processors, is connected to the main memory 102 either through a network 106 or a direct connection as shown in phantom. While described as a physical processor, which it could be, in many applications the processor resides in a virtual space. For example, a Java virtual machine (JVM) resides in a memory space that interacts with the database. The JVM and database are typically located on separate hardware but can be co-located. DBMS may be co-located with main memory 102 and main memory 102 may be located in one or many machines. As explained above, DBMS are generally known in the industry and will not be further explained herein except as necessary for an understanding of the technology of the present application.

Various entities, such as, for example, entities 101, 103, 105, which may include individuals, companies, governments, educational institutions, or the like connect to memory 102 using workstations 108. Workstations 108 may be a thin or fat client workstation. Some workstations may include, for example, conventional desktop computers, laptop computers, mobile computers, handheld computers, Smartphones, portable digital assistant, or the like. Workstations 108 may be directly connectable to network 106, but more typically, workstations 108 are connected to network 106 via a connect server 110 or in some older installations, perhaps workstation 108 is connectable to network 106 via a dial-up connection over a PSTN 112 to an Internet Service Provider 114.

Connections to main memory 102 and DBMS 104 may be through a firewall 116. As is generally understood, a firewall is designed to block unauthorized access while permitting authorized communications over the entities local network. Because main memory 102 and processor 104 are accessible by independent entities, each entity, such as, for example, entities 103 and 105 may impose a firewall 116 to inhibit unauthorized data from being transmitted to or from its individual workstations 108. Moreover, main memory 102 typically will have integrated security to inhibit mingling of data specifically associated with certain entities.

As may be appreciated, main memory 102 and processor 104 can only facilitate a certain number of connections at any particular time. The connections may sometimes be referred to as communication links or threads as is generally understood in the art. To facilitate access, resource allocation is typically established to manage the resource so each company or individual attempting to access the processor(s) 104 and main memory(s) 102 is provided access. For example, access to the shared equipment may be based on the user's access type. U.S. Pat. No. 7,526,767, issued to Rhee et al., on Apr. 28, 2009, and incorporated herein by reference as if set out in full, discussed a computer system resource scheduler. The resources are accessible by users based on the classification of the user's access. For example, the '767 patent discusses an allocated processor and DBMS resource access between on-line users (requestors) and batch users (off-line requestors). In the examples provided, the '767 patent greatly favors allocated resources to a specific class of users, but does not distinguish between users of a particular class. Thus, if a processor has 10 available resource threads, and the resources are allocated such that 80% of the resources are available for on-line users, then a single on line user can monopolize 8 of the 10 available threads.

Other resource allocation systems may prioritize the resource request. For example, with reference to U.S. Pat. No. 7,448,036, issued to Brenner et al., on Nov. 4, 2008, which is incorporated herein by reference as if set out in full, a resource allocation system is provided. The '036 patent discloses assigned particular job or resource requests priorities. The processor reviews the priorities and assigned threads to equipment based on the priority of particular requests.

There is, therefore, a need in the art to provide an access engine that allows access to equipment that fairly distributes access by distinguishing users and or job types rather than based on access classifications and priority to avoid a user, class of user, or priorities to monopolize the threads and provide more ubiquitous access to the equipment.

SUMMARY

Aspects of the technology of the present application include systems, methods, and apparatuses to allocate resources among users such that individual users or companies cannot monopolize the resources. In particular, the technology of the present application provides methods to manage access to shared resources in a networked computer system. The method includes receiving a job request and determining whether a thread to process the job request is available. If it is determined that a thread is not available, the job request is queued. If a thread is available, it is next determined whether another job request is currently queued that may be processed by the thread. If another job request is queued, the priority of the two job requests is determined. The job request with the higher priority is provided access to the resource using the thread.

Aspects of the technology of the present application also provide apparatus to manage access to shared resources in a networked computer system. The technology of the present application includes, for example, a processor, a memory, and an access engine all coupled together, such as by a bus. The processor is configured to receive a job request from an access station and at least one of assign the job request to an available thread or save the job request in the memory. The access engine is configured to analyze the job request and cause the processor to assign the job request to a thread based on protocols stored in the memory.

DETAILED DESCRIPTION

The technology of the present application will now be explained with reference to a database management system where data is warehoused in centralized servers and viewable at local or remote workstations having displays. The technology, in general, is described in relation to conventional database management systems; however, the technology of the present application would be useful for allocating resources for any shared equipment, such as, for example, other shared output devices, processors for running reports, applications for processing data and other information, and the like. Moreover, the technology of the present application is explained using a conventional operating system, such as, for example, the Unix Operating Systems or a WINDOWS® operating system, or the like. One of ordinary skill in the art on reading the disclosure will now recognize that the technology of the present application will be useful in other environments and other operating systems. Other operating systems include, for example, Linux, Mac OS X, Solaris, to name but a few conventional operating systems. Moreover, while described as operating on a thin client, the technology of the present application also is useful using a fat client. A thin client would use a remote server or other processor to run the application being accessed by the thin client instead of the local processor as in a fat client. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 2:
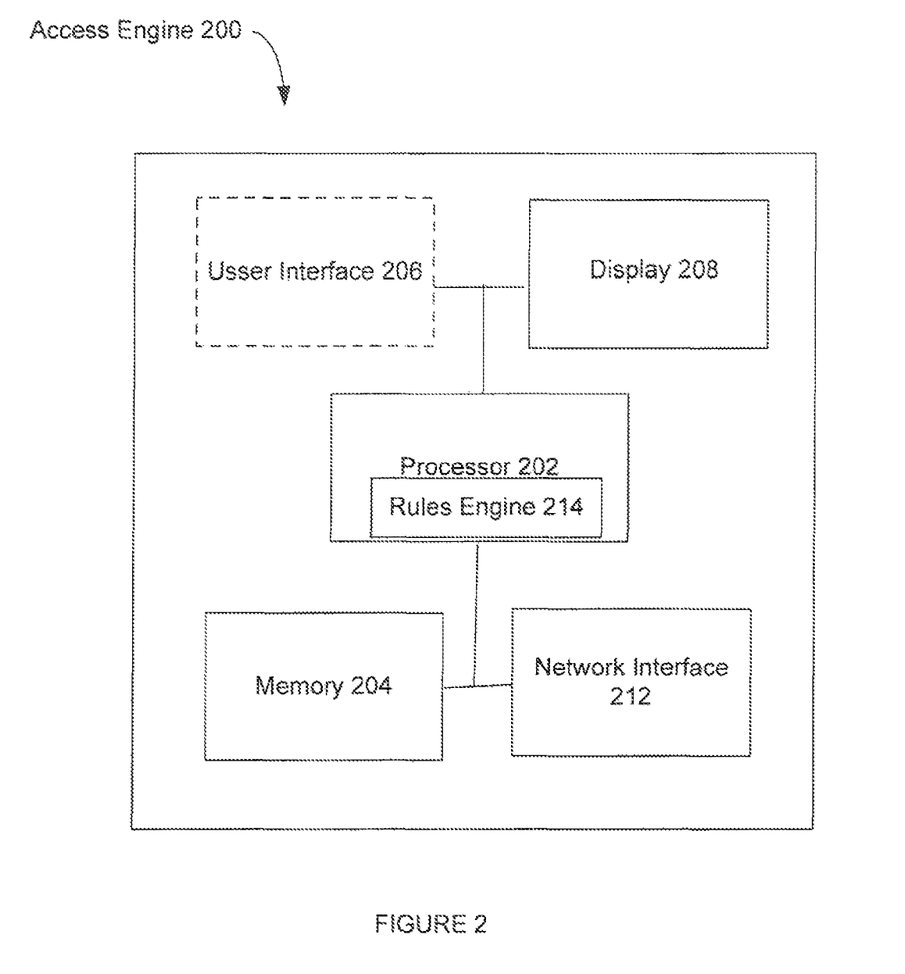
FIG. 2 is a functional block diagram of an access engine consistent with the technology of the present application.

Referring back to FIG. 1, networked computer system 100 provides a number of entities 101, 103, 105 with access to shared equipment 102 and 104. Access to the shared equipment 102 and 104 may be managed by an access engine 200, as shown in FIG. 2. An access engine may be local or remote from the shared equipment or may be co-located with the shared equipment. In many instances, access engine 200 will be co-located or integrated with processor 104, which in the present example of FIG. 1 above, is a DBMS. Referring now to FIG. 2, access engine 200 will be described. For a DBMS system as explained above, access engine 200 sometimes may be referred to as a throttle or throttling engine as it controls the flow of access to the equipment similarly to a throttle controlling a flow of fuel. In this example, access engine 200 generally includes a processor 202, such as a microprocessor, chipsets, field programmable gate array logic, or the like, that controls the major functions of the access engine 200, such as, for example, requesting, fetching, manipulating, and transmitting data to DBMS 104 and memory 102 or the like. Processor 202 also processes various inputs and/or data that may be required to operate the access engine 200 as is conventional in the art. Access engine 200 also includes a cache or memory 204 that is interconnected with processor 202. The memory 204 may be remotely located or co-located with processor 202. The memory 204 stores processing instructions to be executed by processor 202. The memory 204 may be any conventional media and include either or both volatile or non-volatile memory. Optionally, access engine 200 may include a user interface 206 that is interconnected with processor 202. Such user interface 206 can be leveraged to interact with the access engine. The access engine 200 may include at least one display 208 that has a graphical user interface (GUI) that allows interaction with access engine 200. Alternatively access engine may be interacted with through workstations 108 or processor 104.

As can be appreciated, DBMS 104 and access engine 200 work cooperatively to provide connections between users 101, 103, and 105 and memory 102. For example, assume DBMS 104 can manage 100 connections or threads to memory 102 at any given moment. The access engine 200 would assign the 100 connections to users (according to the protocol as described below). In the normal course, however, DBMS 104 and access engine 200 may need to manage more than 100 access requests. The non-assigned access requests, which may alternatively be called jobs or the like, would be stored in a cache or queue, such as, for example, memory 204 and assigned the stored jobs to a thread as the threads become available.

Also, in some cases, any particular user may need a large amount of processing time for any particular request. To avoid a situation where a single job monopolizes a thread, the job may be processed in phases (as explained further below) where after each phase of the process, the job is stored in a cache or queue until its next available thread where, at which time the next phase of the request may be processed.

In some cases, a particular user 101, 103, or 105 may have a number of requests in queue (whether original requests or in process requests). In these instances, as will be explained below, the user 101, 103, 105 may prioritize their requests to assign a processing order. For example, if user 101 has 10 requests in queue due to the unavailability of threads, the access engine would in the normal course process the requests on a first in first out priority for user 101. However, access engine 200, as explained in more detail below, will allow a user the ability to access its queue such that, for example, job request 5 may process before job request 2, etc.

Figure 3:
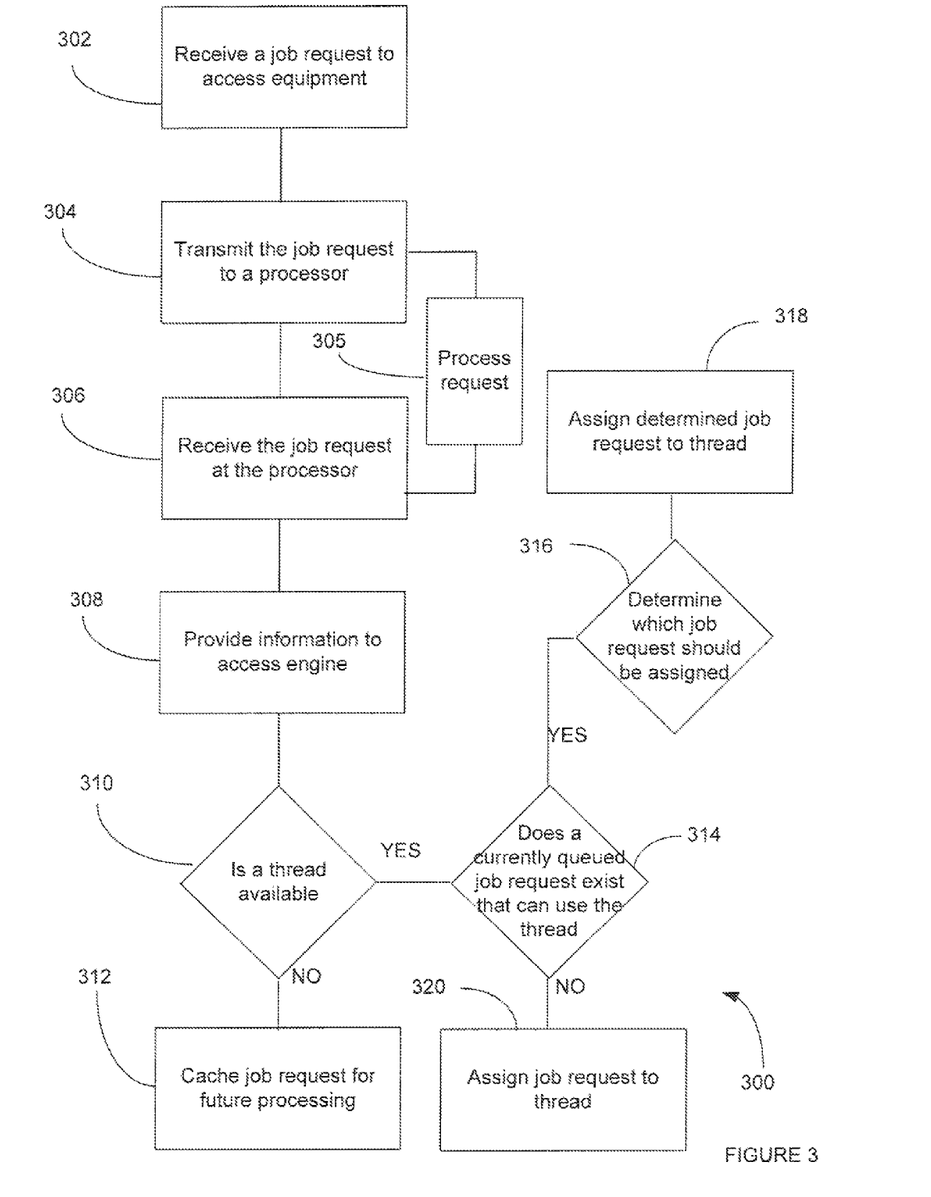
FIG. 3 is a flowchart illustrative of a methodology according to one aspect of the technology of the present application.

Referring now to FIG. 3, an exemplary methodology 300 associated with managing job requests to particular equipment. While the methodology is explained below using a number of discrete steps, one of ordinary skill in the art will now recognize that certain of the discrete steps may be combined into a single step, single steps may be executed by a number of steps, and the steps may be performed in alternative order described without departing from the spirit and scope of the technology of the present application. It should also be recognized that the technology of the present application is being described as access to main memory using a DBMS system having an access engine. Still further, the description is provided in reference to a "software as a service" model in that the DBMS and main memory may be accessible to multiple unaffiliated users. Thus, mechanisms are placed to distinguish one entity from annotations of another entity. To the extent the software was provided as a package to an individual company, it may not be necessary to distinguish between entities that provide the annotations.

As shown by methodology 300, the process begins by receiving a job request to access resources, step 302. For example, a customer user CU at a workstation 108 may submit a job request to display all temporary staff with submitted time in the last 2 weeks. The request is transmitted to processor 104, step 304, and received by processor 104, step 306. The request may be pre-processed by workstation 108 or by processor 104 to include additional header information along with the request, step 305 (shown in parallel with the transmit and receive steps, but may occur in any number of places). For example, with reference to FIG. 4, a data packet 400 is processed and transmitted, or received and processed. Data packet 400 includes, for example, the actual job request block 402. The data packet 400 also, however, includes information regarding the CU requesting the job and/or the entity 101, 103, or 105 requesting the job in the requestor block 404, and a requesting address, which as will be explained below, may be necessary for returning a completed job data packet in the address block 406. The processor 104 provides information relating to the job request to the access engine, step 308. The access engine reviews the information and determines whether a thread capable of processing the job request is available, step 310. If a thread is not available, the job request is cached or queued until a thread is available, step 312. If a thread is available, the access engine next determines whether at least one currently queued job request exists in memory that can be serviced by the thread, step 314. If at least one other queued job request exists, the access engine determines which job request should be provided access to the thread, step 316. The job request that should be provided access is assigned to the thread, step 318, and the job request is processed in due course. If no other job requests in the queue can be serviced by the available thread, the job request is assigned to the thread, step 320, and the job request is processed in due course.

Figure 5:
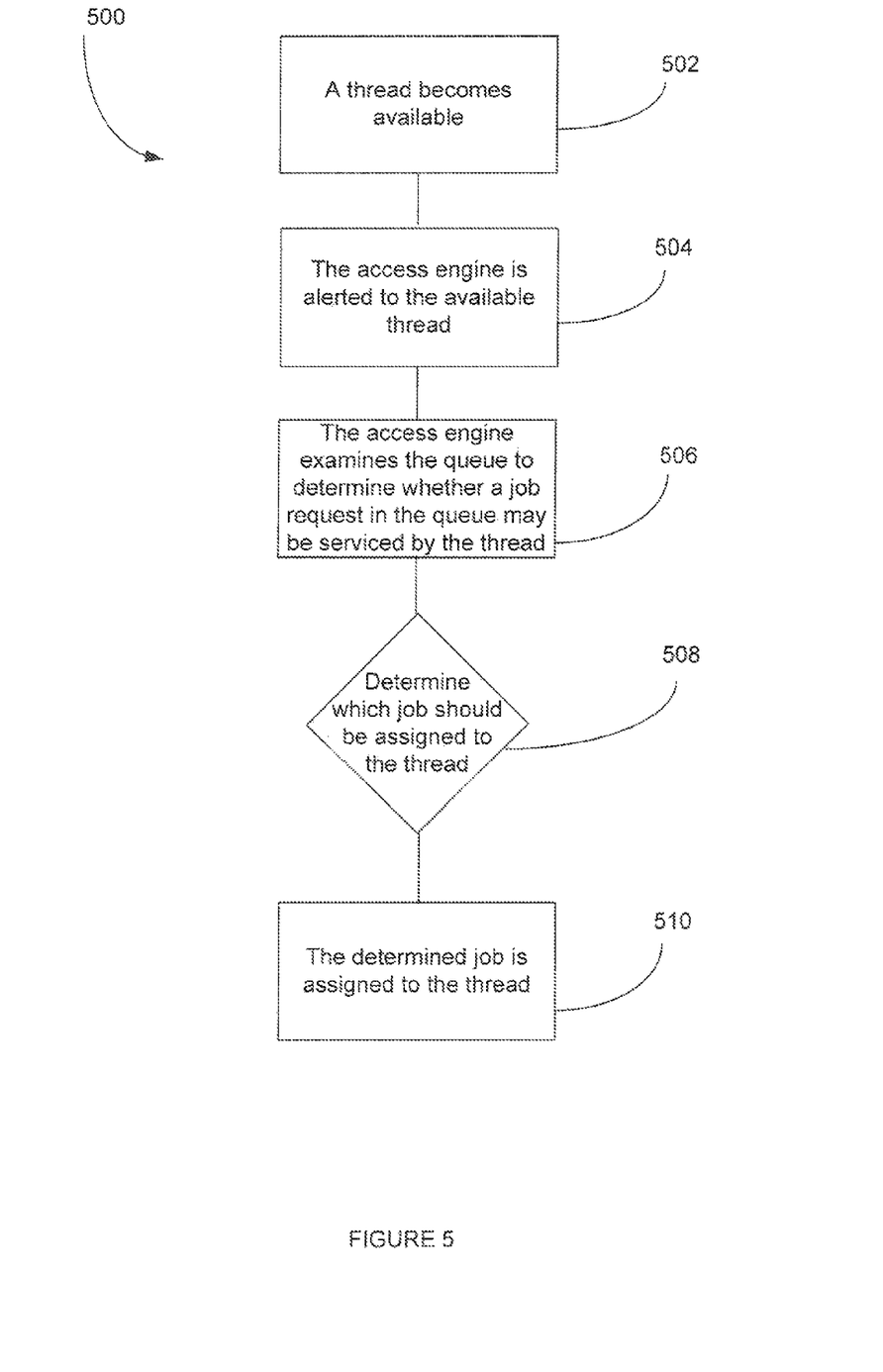
FIG. 5 is a flowchart illustrative of a methodology according to one aspect of the technology of the present application.

Referring now to FIG. 5, an exemplary methodology 500 associated with managing job requests to particular resource is provided. Unlike methodology 300 above, which is shown how a new job request is processed, methodology 500 relates to managing access as threads become available. While the methodology is explained below using a number of discrete steps, one of ordinary skill in the art will now recognize that certain parts of the discrete steps may be combined into a single step, single steps may be executed by a number of steps, and the steps may be performed in alternative order described without departing from the spirit and scope of the technology of the present application.

The process begins at step 502 by a thread becoming available. The thread may become available for numerous reasons including, for example, because the job request has been completed, the job request has been paused, the job request has been terminated. The processor would alert the access engine that the thread is available, step 504. The access engine would examine the queue to determine whether one or more job requests may be serviced by the available thread, step 506. Of the one or more job requests that may be serviced by the available thread, the access engine would determine which job request should be assigned to the thread, step 508. The determined job request is assigned to the thread, step 510.

Figure 6:
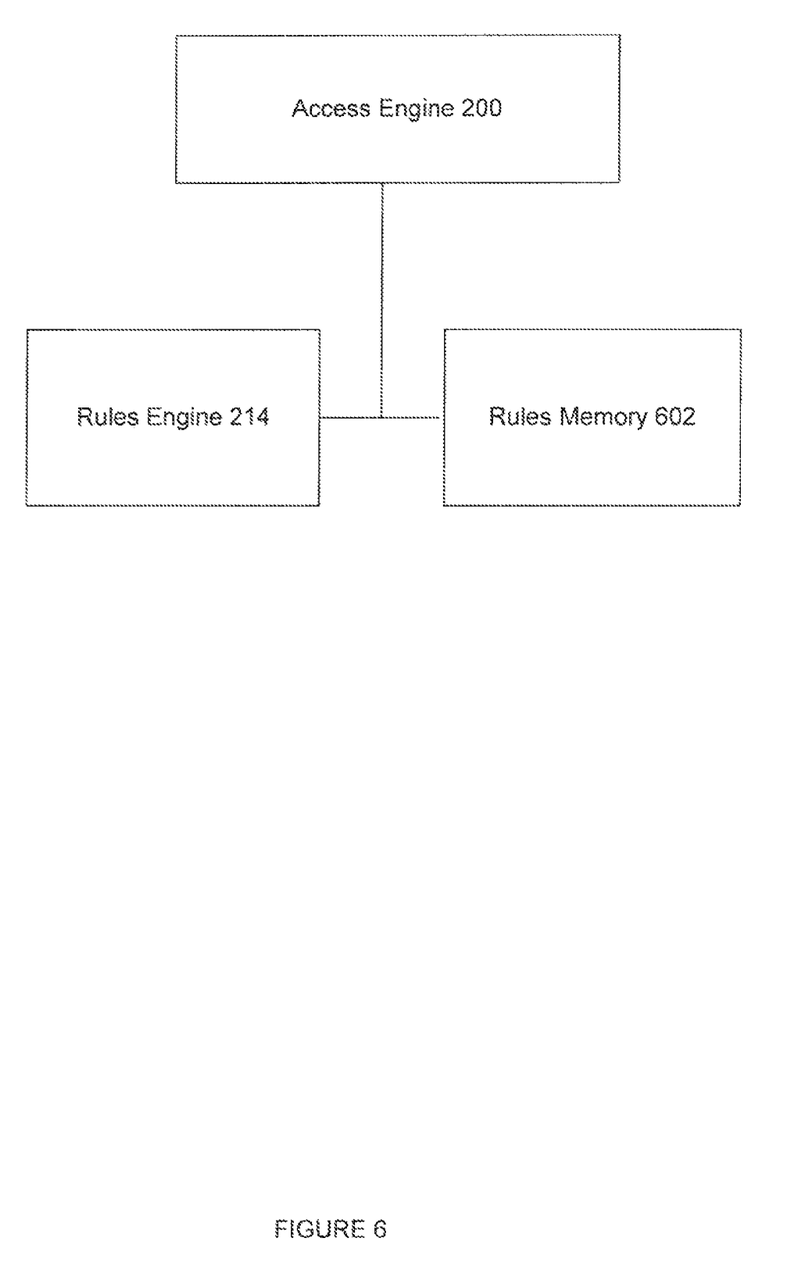
FIG. 6 is a functional block diagram according to one aspect of the technology of the present application.

As mentioned above, access engine 200 determines the priority of job requests to assign the job requests to available threads in accordance with protocols as shown by the exemplary flowcharts provided above. Access engine may make the determination using a rules engine 214 coupled to processor 202. The rules engine 214 is shown integral to processor 202 but could be either co-located or remote as a matter of choice. The particular rules associated with rules engine 214 may be stored in main memory 102, memory 204, or a combination thereof. As shown in FIG. 6, rules engine 214 is connected to a rules memory 602 (which may be incorporated into main memory 102, memory 204, a completely separate memory system, or a combination thereof. The access engine 200 monitors the threads and job requests and request information from rules engine 214 to assign job requests to available threads. For example, assigning at least one job request residing in a job queue, access engine 200 may provide information to rules engine 214 regarding the length of time particular threads have been active for a single job request. If the thread has been active for a particular job request over a certain predefined time period (which may be microseconds, milliseconds, seconds, minutes, hours, etc), the rules engine 214 would signal access engine 200 to suspend the job request at the next available break point and store the job in the queue or cancel the request completely and notify end users (specific behavior is a design decision). The rules engine 214 (based on further protocols explained below) would determine which of the job requests existing in the queue should be assigned to the now available thread, and assign that job request to the available thread, which may, in fact, be the just paused job request. Alternatively, rules engine 214 may be configured to suppress the ability of the paused job request to immediately re-access the thread.

Figure 4:
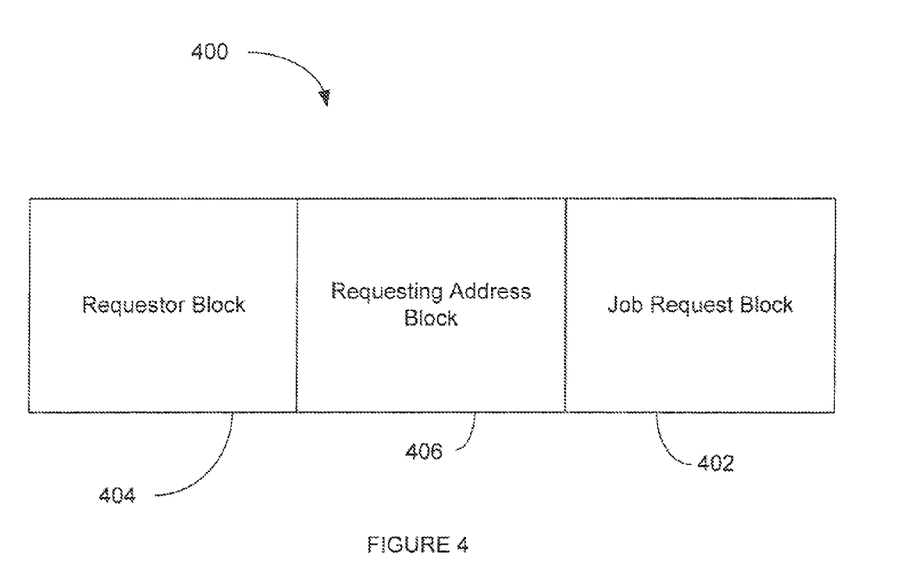
FIG. 4 is an exemplary data block consistent with the technology of the present application.

As job requests are received by access engine 200, the job request will have identification information. For example, the requestor block 404 may identify a particular entity making a request, a particular user within the entity making the request, etc. The rules engine 214 and rules memory 602 would review active and pending job requests to limit the ability of any entity to monopolize the threads. Thus, for example, a particular user may be able to run six job requests on threads at any given time. The seventh job request would be queued. Particular entities, which may have multiple individual users, may similarly be limited in the total number of active threads at any given time. Typically, the entity limitation would be greater than the individual user limitation. Also, in a similar vein, some job requests are scheduled requests or batch requests vs. real-time or near real-time requests. Generally, the scheduled or batch job requests are restricted in the number of threads that they can access. The restrictions on access may be variable as well. For example, during high demand times, a particular user may be limited to no more than two active job requests at a time; whereas, during times of lower demand, the particular user may have the limit increased to ten active job requests at a time. The particular numbers above are exemplary and should not be considered limiting. Also, some threads may be reserved for particular types of access. For example, assume the batch job requests may be assigned 10 dedicated threads and the real-time job requests may be assigned 60 dedicated threads. A certain number of dedicated threads may be temporarily accessible by each type of job request if a sufficient number of dedicated threads are free and no job request of that type is queued. So, for example, if only 2 batch job requests are running, the access engine based on the rules engine may assign the 61 real-time job requests to one of the free batch job request threads. The number of dedicated threads for particular job types that may be made available to other job types may vary depending on factors, such as, for example, expected demand.

The rules engine 214 and rules memory 602 may receive individual priority requests as well. For example, a particular user may have ten job requests pending in a queue. The particular user (or an administrator) may be able to assign priorities so the particular user's job requests are processed in a particular order. In addition, the requestor block 404 may include a priority indicator depending on the user such that a supervisor or manager may always receive a higher job priority and likely earlier assigned threads based on the position.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented using a number of different devices. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method to manage a plurality of threads to allow access to shared resources in a networked computer system where the shared resources are accessible by a plurality of independent entities, the method comprising the steps performed on at least one processor comprising:
   receiving at least one job request from one requestor of a plurality of requestors accessing the shared resources in the networked computer system, wherein the one requestor works for one entity of a plurality of entities;
   appending the job request with information regarding the one requestor, the entity the one requestor works for, and a requestor address;
   determining whether a thread to process the job request is available;
   if it is determined that a thread to process the job request is available, determining whether at least one other job request is currently queued that may be processed by the available thread;
   determining whether the job request or at least one other job request should be provided access to the available thread, wherein determining includes calculating both whether the one requestor has over a predetermined number of active job requests being processed by threads and whether the one entity for which the requestor works has over a predetermined number of active job requests being processed by threads, wherein the active job requests of the one entity for which the requestor works comprises both the one requestor and a set of other requestors that work for the one entity of the plurality of requestors;
   if it is determined that the job request should be provided access, assigning the job request to the thread; and if it is determined that the other job request should be provided access, assigning the other job request to the thread; and
   queuing the job request or the other job request based on whether the job request or the other job request is assigned to the thread.

2. The method of claim 1 wherein the other job request comprises a plurality of other job requests.

3. The method of claim 1 wherein the step of determining whether the job request or at least one other job request should be provided access to the available thread comprises the step of identifying whether the job request has a higher priority than the other job request.

4. The method of claim 1 wherein the step of determining whether a thread to process the job request is available comprises calculating whether any threads have been processing an active job request over a predetermined time and suspending the active job request to make the thread on which processing has been suspended available for another job request.

5. The method of claim 1 wherein the step of determining whether a thread to process the job request is available comprises determining whether a dedicated thread may be temporarily reassigned to process the job request.

6. A method to manage access to shared resources in a networked computer system accessibly by a plurality of independent entities, the method comprising the steps performed on at least one processor comprising:

appending a job request to access a shared resource, wherein the shared resource is shared by a plurality of requestors and a plurality of entities for which the plurality of requestors work, with information regarding a single requestor for the plurality of requestors, an entity for which the single requestor works, and a requestor address;

receiving an indication that at least one thread is available;

determining whether one or more job requests exist in a queue that may be processed by the available thread;

if it is determined that one job request exists in the queue, then assigning the one job request to the available thread to be processed; and if it is determined that more than one job request exists in the queue, using the information appended to the job request to determining which of the more than one job request has a higher priority and assigning the highest priority job request to the available thread to be processed, wherein the priority of the job request is based at least in part on a number of concurrent job requests being run by the single requestor and the entity for which the single requestor works and at least in part on priority factors selected from a group of priority factors consisting of: the number of concurrent job requests that are the same, the length of time the job request will take to be processed, or the length of time the job request has been in the queue.

7. The method of claim 6 wherein the priority of the job request is determined based on a priority associated with the requestor and the entity.

8. The method of claim 6 wherein the priority of the job request is determined based on a length of time the job request has been in the queue.

9. The method of claim 6 wherein the priority of the job request is based on a priority assignment from the requestor.

10. The method of claim 6 wherein the priority of the job request is based on the number of other active job requests of the requestor and the entity.

11. A resource management system networked to at least one access station that is configured to generate a job request to be executed by a shared resource managed by the resource management system where the shared resource is accessible by a plurality of independent entities, the resource managing system comprising:

a processor;

a memory coupled to the processor; and an access engine coupled to the processor, wherein the processor is configured to receive a job request appended with information regarding a requestor, an entity that the requestor works for, and a requestor address from the at least one access station and at least one of assign the job request to an available thread or save the job request in the memory;

the access engine configured to cause the processor to determine whether the job request or at least one other job request should be provided access to the thread, wherein the access engine is configured to calculate whether the requestor and the entity that the requestor works for has over a predetermined number of active job requests being processed by threads, wherein determining a number of requests made by the entity that the requestor works for includes combining a number of active job requests by the requestor and a number of additional active lob requests by a set of requestors that work for the entity;

if it is determined that the job request should be provided access, the access engine configured to cause the processor to assign the job request to a thread based on protocols stored in the memory.

12. The resource management system of claim 11 wherein the memory comprises a cache memory to store job requests until the thread is available and a rules memory to store the protocols for assigning the job request to the thread.

13. The resource management system of claim 11 wherein the resource management system comprises a database management system.

* * * * *